Figure 1:
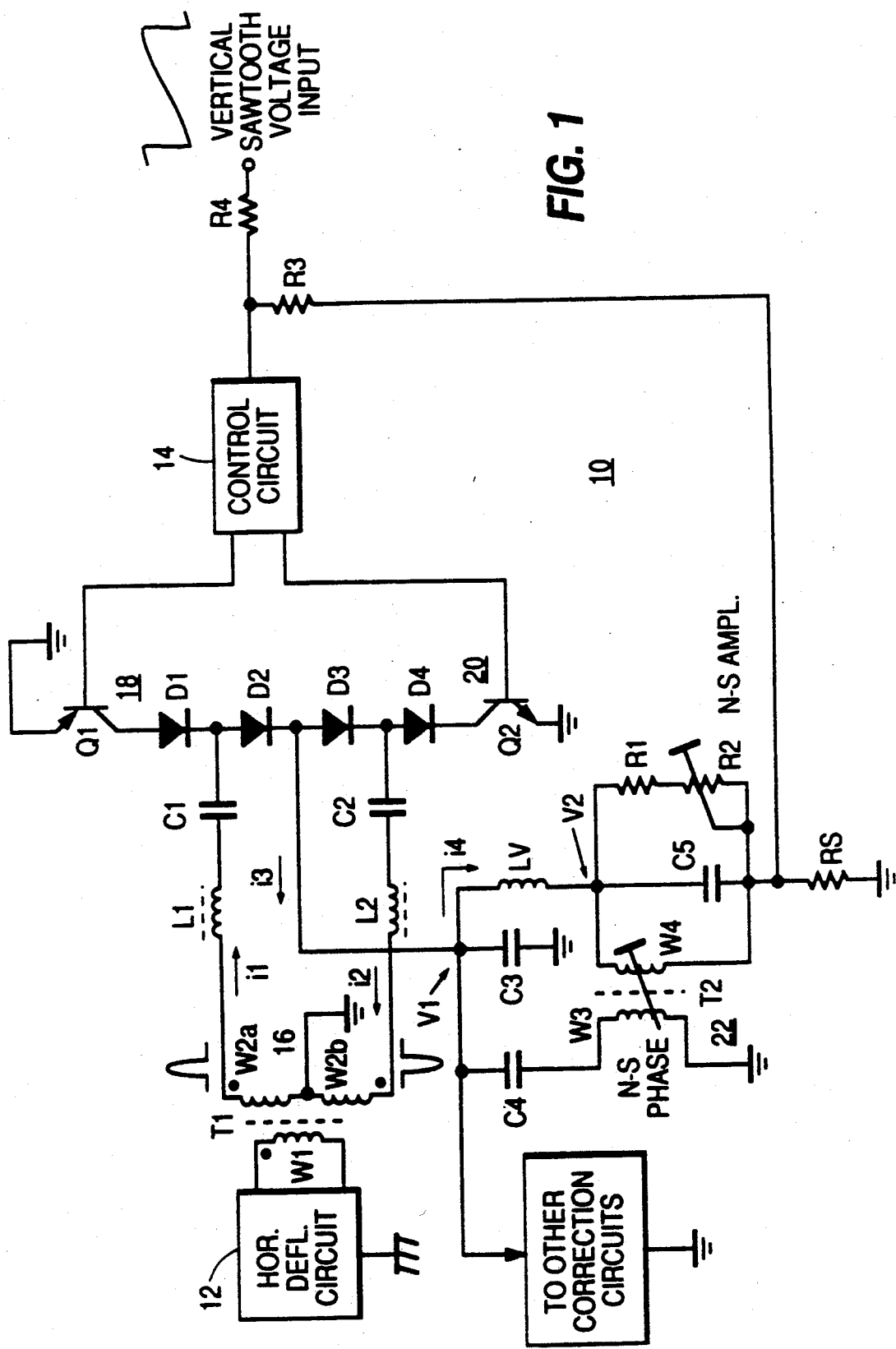

United States Patent [19]

Haferl

[11] Patent Number: 5,111,120
[45] Date of Patent: May 5, 1992

[54] RASTER CORRECTED VERTICAL DEFLECTION CIRCUIT

[75] Inventor: Peter E. Haferl, Adliswil, Switzerland

[73] Assignee: RCA Licensing Corporation, Princeton, N.J.

[21] Appl. No.: 655,526

[22] Filed: Feb. 14, 1991

[30] Foreign Application Priority Data

Feb. 27, 1990 [GB] United Kingdom ............... 9004392

[51] Int. Cl.$^5$ .................... G09G 1/04; H01S 29/72
[52] U.S. Cl. ................................ 315/393; 315/397
[58] Field of Search ............ 315/396, 397, 393, 408, 315/405

[56] References Cited

U.S. PATENT DOCUMENTS

| | | | |
|---|---|---|---|
| 3,774,068 | 11/1973 | Yasumatsuya | 315/393 |
| 3,845,352 | 10/1974 | Newman | 315/393 |
| 4,041,354 | 8/1977 | Haferl | 315/371 |
| 4,048,544 | 9/1977 | Haferl | 315/408 |
| 4,079,293 | 3/1978 | Haferl | 315/387 |
| 4,088,931 | 5/1978 | Haferl | 315/371 |
| 4,096,415 | 6/1978 | Haferl | 315/393 |
| 4,117,380 | 9/1978 | den Hollander | 315/393 |
| 4,132,929 | 1/1979 | Riechmann | 315/408 |
| 4,174,493 | 11/1979 | Dobbert et al. | 315/408 |
| 4,278,919 | 7/1981 | Hugo et al. | 315/393 |
| 4,296,360 | 10/1981 | Rilly | 315/387 |
| 4,338,549 | 7/1982 | Haferl | 315/393 |
| 4,544,864 | 10/1985 | Haferl | 315/393 |
| 4,999,549 | 3/1991 | Wilber | |

OTHER PUBLICATIONS

SMVD–Eine neue Vertikalabenkschaltung Für Fernsehgeräte, P. Schultz, Mar. 1977, Standard Elektrik Lorenz AG, Esslingen, Federal Republic of Germany, and English Translation.

Primary Examiner—Gregory C. Issing
Attorney, Agent, or Firm—Joseph S. Tripoli; Joseph L. Laks; Harvey D. Fried

[57] ABSTRACT

Two windings of a flyback transformer in a horizontal deflection circuit are inductively coupled with opposite polarity to a source of horizontal rate retrace pulses. The windings have a common junction coupled to ground. A circuit energized by the retrace pulses generates modulated currents of opposite polarity. Conduction of each current is controlled by a switch circuit including a semiconductor switch and two diodes. The switch circuits are coupled to one another at a junction, and the junction is coupled to an energy storage capacitance. One of the diodes conducts positively valued portions of the respective current through the energy storage capacitance and the other of the diodes conducts negatively valued portions of the respective current through the semiconductor switch. Each semiconductor switch is a current discharge path. The energy storage capacitance is responsive to the currents for developing a vertical deflection voltage in phase with the currents at the horizontal rate for driving a vertical deflection current in a vertical deflection yoke. The vertical deflection current is related to the difference in amplitude between positively valued portions of the currents. A North-South pincushion correction current in phase with the horizontal deflection is generated by integration of the vertical deflection voltage in the vertical deflection yoke. A North-South pincushion transformer has a first winding capacity coupled to the energy storage capacitance and a second winding forming part of a horizontal rate resonant circuit coupled in series with the vertical deflection yoke.

30 Claims, 3 Drawing Sheets

RASTER CORRECTED VERTICAL DEFLECTION CIRCUIT

This invention relates generally to the field of vertical deflection circuits, and in particular, to the field of switched vertical deflection circuits.

New generations of color television picture tube-yoke combinations may require North-South pincushion correction. A further requirement can be DC coupling between a vertical deflection amplifier and the deflection yoke, for example when producing a flicker-free AA-BB display. Each field is scanned twice, consecutively, at twice the normal scanning rate, in such AA-BB displays. It is therefore desirable to have a DC coupled vertical deflection circuit producing vertically modulated horizontal rate waveforms for applying to a simple North-South pincushion correction circuit.

Some of these characteristics suggest the family of the switched vertical deflection circuits are appropriate. However, switched vertical deflection circuits can have the following disadvantages:

A first kind of switched vertical circuit is the synchronous switched vertical deflection circuit, often referred to as an SSVD, which employs two thyristors. The thyristors are turned on at modulated instants during the horizontal retrace period. The use of fast thyristors can require a complex control circuit, which can be too expensive. Examples of SSVD circuits are shown in the following U.S. Pat. Nos. 4,041,354; 4,079,293; 4,096,415; 4,117,380; and, 4,338,549.

A second kind of switched vertical circuit is the switched mode vertical deflection circuit, often referred to as an SMVD, employs two switching transistors. The transistors are turned on at modulated instants during the horizontal trace period. This produces a strong phase modulation of the horizontal rate waveforms, which therefore cannot be employed for North-South raster correction. An example of an SMVD circuit is shown in U.S. Pat. No. 4,174,493.

A third kind of switched vertical circuit is the single switch vertical deflection circuit, which employs either a thyristor or a transistor switch with antiparallel diode. The phase changes from horizontal retrace to horizontal trace, from top to bottom. Examples of this third kind of switched vertical circuit are shown in the following U.S. Pat. Nos. 4,296,360; 4,544,864; and, 4,499,549. Accordingly, North-South raster correction cannot be obtained.

Moreover, and to further disadvantage, the three circuits described above each require a picture tube protection circuit which shuts down the receiver when one drive signal of the switches is missing, to avoid damage to the picture tube from excessive DC current.

It is an inventive arrangement to provide a new switched vertical deflection system for directly converting horizontal energy into vertical deflection current, wherein a vertically modulated horizontal sawtooth voltage across a vertical deflection yoke can provide North-South pincushion correction. First and second windings are inductively coupled with opposite polarity to a source of horizontal rate retrace pulses from a horizontal deflection circuit. The windings can from part of a horizontal flyback transformer in a horizontal deflection system, operating at a horizontal rate. A circuit energized by the retrace pulses generates modulated currents of opposite polarity. The modulated current generating circuit comprises respective switching networks for directing positively and negatively valued portions of the currents along different paths. The negatively valued portions of the currents are conducted through switches along discharge paths to ground. Modulated quantities of the positively valued portions of the currents are conducted along charging paths through an energy storage device. The energy storage device is responsive to the currents and develops a vertical deflection voltage in phase with the currents for driving a vertical deflection current in a vertical deflection yoke. The vertical deflection voltage reflects a net average charge resulting from charging by the oppositely directed currents. The net average charge is determined by subtracting the positively valued part of one of the currents from the positively valued part of the other current. The vertical deflection voltage is not subject to phase modulation, as in the prior art switched vertical systems described above. Accordingly, a North-South pincushion correction current in phase with the horizontal deflection circuit is generated by integration of the vertical deflection voltage in the vertical deflection yoke. Horizontal rate waveforms phased correctly for producing North-South raster correction, and for other correction circuits, are provided.

It is another inventive arrangement to provide enhanced a switched vertical deflection system which can provide enhanced North-South pincushion correction by use of a pincushion transformer. A pincushion transformer has a first winding capacitively coupled to the energy storage device and a second winding forming part of a horizontal rate resonant circuit coupled in series with the vertical deflection yoke.

It is still another inventive arrangement to obviate the need for shutting down the receiver when one drive signal of the switches in a switched vertical deflection system is missing, to avoid damage to the picture tube from excessive DC current. In switched vertical deflection systems in the prior art, the windings of the flyback transformer are DC coupled in series with inductors, which are in turn DC coupled to the switches, or switching networks, and to an energy storage device. In the switched vertical deflection systems taught herein, each inductor can be AC coupled to the respective switch, or switching network, and to the energy storage device by a capacitor.

It is yet another inventive arrangement to provide a plurality of advantageous topological features, which contribute to improved operation of switched vertical deflection systems. The windings of the flyback transformer coupled to the source of horizontal retrace pulses are coupled together at a first junction, and the first junction is coupled to ground. The windings can be separate, substantially identical windings. Alternatively, the windings can be different halves of a substantially centertapped winding, in which case the center tap is coupled to ground. First and second switches, or switching networks, are respectively coupled to the first and second windings and coupled together at a second junction. The energy storage device for developing the vertical deflection voltage is coupled to the second junction. Respective energy storage devices are coupled to the inductances, which are themselves coupled to the respective windings. The energy storage devices are charged oppositely by respective currents flowing through the windings. The energy storage devices are coupled to the respective switches, or switching networks, providing an access for the current modulating control. The energy storage devices can be embodied as capacitors, which also provide the AC coupling described above.

FIG. 1 is a circuit diagram, in partial block form, showing a switched vertical deflection circuit according to an inventive arrangement.

FIGS. 2(a)-2(f) are waveforms useful for explaining the operation of the circuit shown in FIG. 1.

Figure 3:
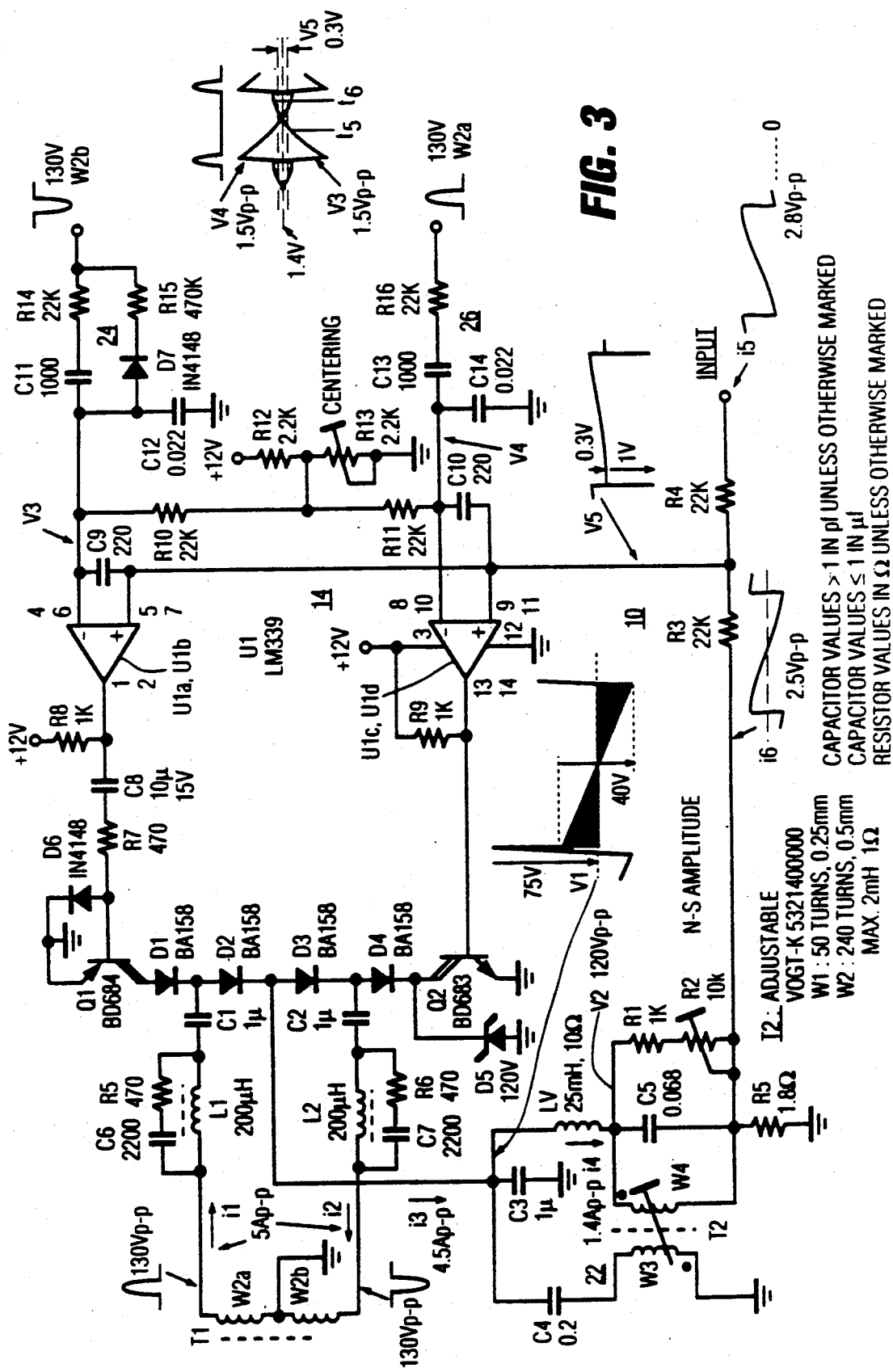

FIG. 3 is an illustrative vertical deflection circuit in according to an inventive arrangement.

A switched vertical deflection system 10 is shown FIG. 1. A horizontal deflection circuit 12, as known in the prior art, is coupled to a winding W1 of flyback transformer T1. Horizontal deflection circuit may operate at a horizontal scanning frequency of $f_H$, as for conventional interlaced scanning. Scanning at $f_H$, for example, can correspond to a rate of approximately 15,750 Hz for NTSC interlaced standards. Horizontal deflection circuit 12 may also operate at a multiple thereof, for example $2f_H$, as for progressive noninterlaced scanning. The scanning rates $f_H$ and $2f_H$ will have different values for PAL and SECAM standards in Europe, where for example $f_H$ is approximately 15,625 Hz.

Flyback transformer T1 has another winding W2, which is inductively coupled to winding W1. Winding W2 has a centertap 16 coupled to ground. The center tap 16 defines two windings, or winding portions, W2a and W2b of opposite polarity relative to one another. Accordingly, positive retrace pulses are coupled to winding W2a and negative retrace pulses are coupled to winding W2b. Windings W2a and W2b receive energy from the horizontal deflection system by means of the retrace pulses. The energy is made available to the switched vertical deflection system 10 for generating a vertical deflection current in a vertical deflection yoke.

Briefly, and as will be explained in more detail below, the flyback transformer T1 supplies energy from the horizontal deflection system to the vertical yoke by means of currents i1 and i2 which follow respective conduction paths between the respective windings W2a and W2b and the storage capacitor C3. Current i3, which is the difference of currents i1 and i2, charges storage capacitor C3 at the horizontal rate. Storage capacitor C3 thereby develops a vertical deflection voltage V1. Capacitor C3 discharges into a deflection yoke Lv to produce a vertical deflection current i4. A feedback loop including resistor R3 linearizes and stabilizes the deflection circuit. A control circuit 14 generates the base drive signals for switching transistors Q1 and Q2.

The respective conduction paths for currents i1 and i2 include: respective storage coils, or inductors, L1 and L2; respective coupling capacitors, or energy storage devices, C1 and C2; and, respective diodes D2 and D3. Diodes D2 and D3 are polarized for conduction of horizontal retrace current.

Diodes D1 and D2 and transistor Q1 form a first switch, or switching network, 18, operatively associated with current i1. Diodes D3 and D4 and transistor Q2 from a second switch, or switching network, 20, operatively associated with current i2. Diodes D1 and D4 also serve to isolate transistors Q1 and Q2 from reverse voltages appearing at the collectors during horizontal retrace. Switching networks 18 and 20 are responsive to the control circuit 14, the operation of which is explained in more detail in connection with FIG. 3.

When transistor Q1 is nonconductive, capacitor C1 charges negatively at the junction of diodes D1 and D2, responsive to the positive retrace pulses on winding W2a. When transistor Q2 is nonconductive, capacitor C2 charges positively at the junction of diodes D3 and D4, responsive to the negative retrace pulses on winding W2b. Capacitors C1 and C2 charge to the peak horizontal retrace voltage applied by windings W2a and W2b respectively. Current i3 does not flow, so that capacitor C3 does not receive any charge. The vertical deflection current i4 in vertical deflection yoke Lv remains zero.

The positive currents i1 and i2 are controlled by the amount of discharge of capacitors C1 and C2, respectively. The amount of discharge of capacitors C1 and C2 is controlled by modulating the conduction time of transistors Q1 and Q2, respectively. Transistors Q1 and Q2 are switched on at varying times within the interval t5-t6 in FIGS. 2(a)-2(f), as explained in more detail below. The transistors Q1 and Q2 are turned off during the horizontal retrace interval when diodes D1 and D4 are reverse biased by horizontal retrace pulses.

Briefly, at the start of vertical trace, transistor Q1 is turned on at time t5 and transistor Q2 is turned on at time t6. This causes a large positive current i1 to flow until time t4', and a small positive current i2 to flow until time t3'. The current flow of currents i1 and i2 is due to the energy stored during horizontal retrace in coils L1 and L2, respectively. The instant at which transistor Q1 is turned on is progressively retarded from time t5 to time t6 during vertical trace. During that same interval, the instant at which transistor Q2 is turned on is progressively advanced from time t6 to time t5. This causes a decreasing amplitude of current i1 and an increasing amplitude of current i2, as shown in the right hand parts of FIG. 2(b).

A yoke current is obtained when capacitors C1 and C2 are discharged by transistors Q1 and Q2, respectively. A positive yoke current is obtained when transistor Q1 is in saturation. The positive retrace voltage generates a charge current flowing through inductor L1, capacitor C1, diode D2 and capacitor C3 to ground, resulting in a positive voltage across capacitor C3. When the charge current falls to zero during the first half of the horizontal trace interval, then the charge, or voltage, across capacitor C1 causes diode D2 to become back biased and diode D1 to become forward biased. Capacitor C1 starts to discharge through diode D1 and saturated transistor Q1 during the second half of the horizontal trace time.

A negative yoke current is obtained when transistor Q2 is in saturation. The negative retrace voltage generates a charge current flowing from ground through capacitor C3, diode D3, capacitor C2 and inductor L2, resulting in a negative voltage across capacitor C3. When the charge current falls to zero during the first half of the horizontal trace interval, then the charge, or voltage, across capacitor C2 causes diode D3 to become back biased and diode D4 to become forward biased. Capacitor C2 starts to discharge through diode D4 and saturated transistor Q1 during the second half of the horizontal trace time.

Thus, the amount and polarity of the deflection current i4 is determined by the amount of discharge current flowing through transistors Q1 and Q2. Transistors Q1 and Q2 may operate in a switched manner, or even in class A, providing a current sink or current source. Bipolar transistors Q1 and Q2 as shown in FIG. 1 may be replaced by any other device providing a controllable discharge path. In the following description, transistors Q1 and Q2 operate in a switched manner to minimize dissipation.

Figure 2:
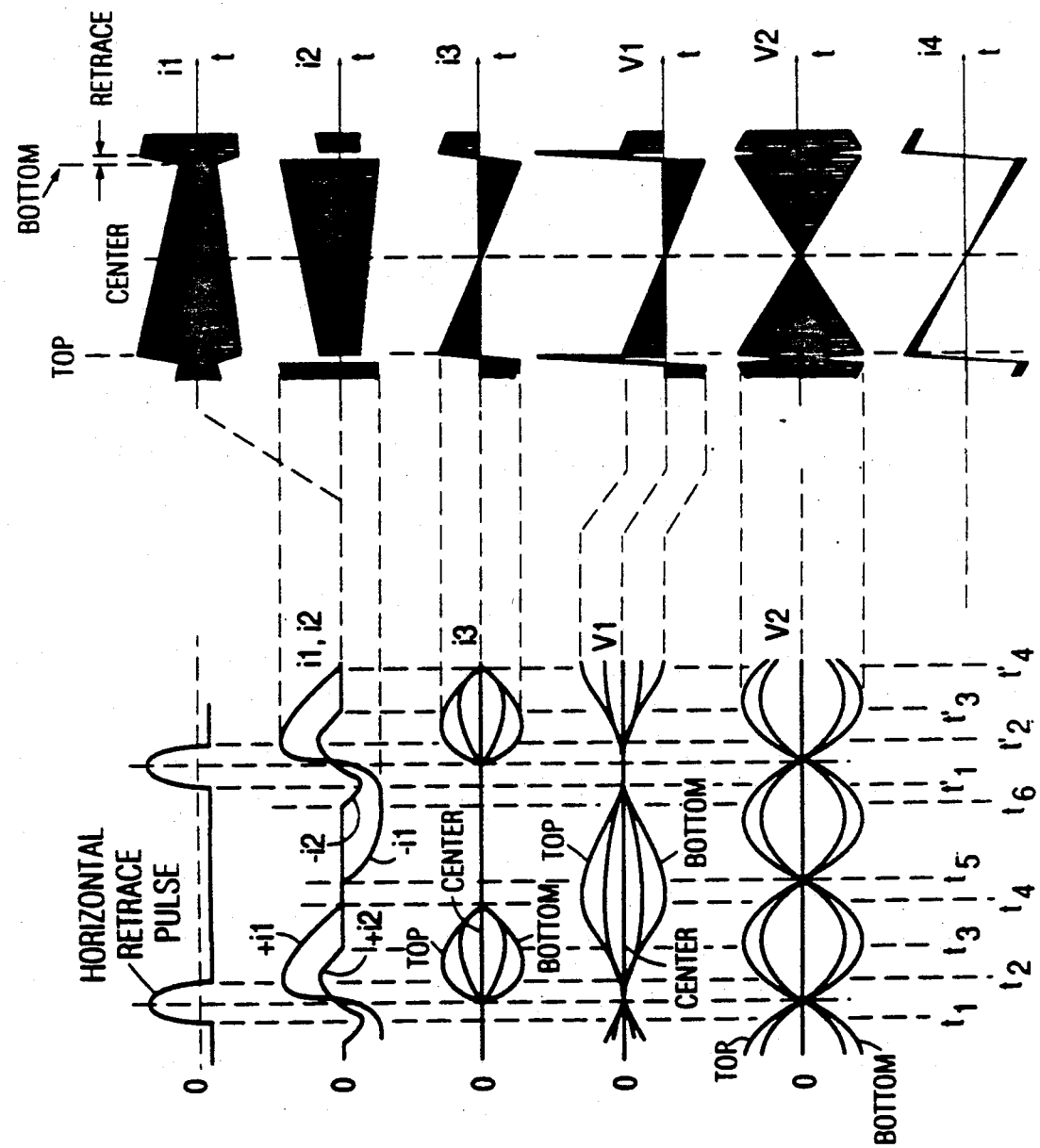

A number of waveforms useful in explaining operation of the switched vertical deflection system 10 are shown in the various parts of FIG. 2. The left hand side of each part in FIG. 2 shows horizontal rate waveforms. The right hand side of each part shows the corresponding vertical rate waveforms. The time lines of the vertical rate waveforms are marked with respect to the TOP, CENTER and BOTTOM of the display, or field. The vertical retrace interval is between the BOTTOM of a field and the TOP of the next successive field. FIG. 2(a) shows only horizontal rate retrace pulses. FIG. 2(b) shows separate vertical rate waveforms for currents i1 and i2, shown together at the horizontal rate. The upper parts of each of the vertical rate waveforms for currents i1 and i2 show the positively valued portions of currents i1 and i2 respectively, flowing through diodes D2 and D3 respectively. The lower parts of each of the vertical rate waveforms for currents i1 and i2 show the negatively valued portions of currents i1 and i2 respectively, flowing through transistors Q1 and Q2 respectively. FIG. 2(c) shows current i3. FIG. 2(d) shows voltage V1. FIG. 2(e) shows voltage V2. FIG. 2(f) shows only the vertical rate current i4.

In operation, deflection current i4 starts with positive peak amplitude at the start, or TOP, of the vertical trace. At the TOP, transistor Q1 is switched into saturation at time t5 and substantially discharges C1. This causes a large amplitude of charge current i1 flowing through diode D2. Stored horizontal retrace energy in coil L1 causes positive current i1 to flow until time t4'. Transistor Q2 is turned on at time t6 producing a small discharge current i2 and consequently a small charge current i2 which flows through diode D3 until time t3'. The vertical yoke is driven by current i3 which is the difference of positively valued portion of current i1 minus the positively valued portion of current i2. Current i3, the waveform shown in FIG. 2(c), charges capacitor C3 producing voltage V1, the waveform shown in FIG. 2(d). Voltage V1 increases until the amplitude of current i3 becomes smaller than the amplitude of the deflection current i4.

Deflection current i4, the waveform shown in FIG. 2(f), is obtained by discharging capacitor C3 through the vertical deflection yoke Lv and current sampling resistor Rs. The deflection yoke Lv integrates the horizontal rate voltage across capacitor C3 to a substantially sawtooth current at the vertical rate. Due to the large inductance of the deflection winding, the discharge current cannot follow the roughly triangular horizontal rate voltage across capacitor C3. Consequently, the current i4 through the deflection winding results from the average of the voltage across the capacitor C3. Therefore, the deflection winding acts as a current sink to discharge capacitor C3. The parallel resonant frequency of the capacitor C3 and the deflection winding determines the vertical retrace interval. The sawtooth shaped voltage V1, as integrated by the high inductance of the deflection yoke Lv, produces at least some parabolic North-South raster correction current. A deflection current sample across sampling resistor Rs is fed back to the control circuit 14 to linearize the operation of the deflection circuit.

During the first half of vertical trace, that is from the TOP to the CENTER, the turn on time of transistor Q1 is progressively retarded from time t5, toward time t6. During the same interval, the turn on time of transistor Q2 is progressively advanced from time t6, toward time t5. This causes a progressively decreasing amplitude of current i1 and a progressively increasing amplitude of current i2. The amplitude of current i3, which is the difference of the positively valued portion of current i1 minus the positively valued portion of current i2, also progressively decreases. As a result, the amplitudes of voltage V1 and vertical deflection current i4 also progressively decrease. The amplitudes of the positively valued portions of current i1 and i2 are equal at the CENTER of vertical trace. Consequently, current i3, voltage V1 and current i4 are zero. Current i1 flows through diode D2 and transistor Q1 and current i2 flows through diode D3 and transistor Q2.

During the second half of vertical trace, Q1 continues to be turned on progressively retarded from time t5, toward time t6. Transistor Q2 continues to be turned on progressively advanced from time t6, toward time t5. This causes a further progressive decrease of current i1 and a further progressive increase of current i2. As a result, current i3, voltage V1 and current i4 progressively increase in the negative direction.

Vertical retrace starts when the turn on time of transistor Q1 is quickly shifted from back from time t6 to time t5, and transistor Q2 is held in cut off. This causes a retrace resonance of one half cycle between vertical deflection yoke Lv and capacitor C3, causing a rapid and loss free reversal of the deflection current i4. As vertical deflection current i4 changes its direction rapidly, a large but narrow retrace voltage pulse is produced, evident in the waveform showing voltage V1. As explained above, the turn on times of transistors Q1 and Q2 are modulated during the interval from time t5 to time t6 to obtain a modulated current i3, which starts to flow at the CENTER of horizontal retrace and ends at time t4'. Transistors Q1 and Q2 are turned off during the second half of retrace when diodes D1 and D4 are non-conductive.

The circuit requires some overlap of currents i1 and i2 to avoid deflection current distortions of discontinuities. This is illustrated by vertical rate waveforms of currents i1 and i2. Overlap current is highest at the CENTER of the vertical trace when current i3 is zero. The overlap current decreases from the CENTER toward TOP and BOTTOM. The overlap current can be determined by subtracting current i3 from current i1 during the first half of trace, and by subtracting current i3 from current i2 during the second half of trace.

The time duration of the envelope of current i3 is not modulated because current i3 is formed by the difference of the positively valued portions of currents i1 and i2. This causes horizontal sawtooth voltage V1 to be in phase with the horizontal retrace pulses. The peaks of voltage V1 appear always at time t4, where current i3 decreases to zero. This allows a North-South pincushion correction circuit 22 to be driven by voltage V1, as shown in FIG. 1. A pincushion transformer T2 has a primary winding W3 coupled to capacitor C3 through capacitor C4. A secondary winding W4 forms a line frequency resonant circuit with a capacitor C5, producing the vertically modulated sine wave voltage V2, shown in FIG. 2(e), at the low side of the deflection yoke Lv. Voltage V2 generates a cosine wave (90 degrees phase shifted) raster correction current in vertical deflection yoke Lv as it is required for raster correction. In other words, the horizontal rate sawtooth voltage V1 is applied to the primary winding W3 of transformer T2 through capacitor C4. The secondary winding W4 forms a horizontal rate resonant circuit together with capacitor C5 to produce the modulated sine wave voltage V2. Sine wave voltage V2 injects a cosine current into the yoke winding, as required for North-South raster correction. The zero-crossings of the horizontal rate envelope of voltage V2 are not modulated. Further, the zerocrossing is always at the center of the horizontal retrace interval. Voltage V1, being in phase with horizontal rate waveforms, may be employed by other circuits for correcting moustache and gullwing distortion and for dynamic convergence.

Vertical deflection deflection yoke Lv is DC coupled to switching transistors Q1 and Q2 and to the control circuit 14. This permits the use of this circuit in receivers with AA-BB display or other features requiring dynamic raster shift. Flyback transformer winding W2 is AC coupled to the vertical deflection circuit by capacitors C1 and C2. The AC coupling allows operation of the deflection circuit without a picture tube protection circuit. The absence of base drive for either or both of transistors Q1 and Q2 does not produce excessive DC current in vertical deflection yoke Lv, such as may damage the picture tube.

The value of capacitor C3 is matched to the inductance of vertical deflection yoke Lv to produce a correct vertical retrace time. Further, voltage V1 should decrease to about ground potential at time t1'. The averaged horizontal retrace voltage, or the trace voltage across winding sections W2a and W2b, should be twice the required peak voltage across vertical deflection yoke Lv. Inductors L1 and L2, and capacitors C1 and C2 are equal in value. The component values are selected to obtain the necessary amplitude and shape of currents i1 and i2.

FIG. 3 shows a more complete circuit schematic for the switched vertical deflection circuit 10, adapted for operation with a Videocolor 110° SP picture tube A68 EAU00X01. The various operational waveforms are similar to those shown in FIG. 2. Peak to peak values of currents and voltages are noted directly, as are some additional waveforms.

The control circuit employs a quad voltage comparator U1. Each output transistor Q1, Q2 is driven by two comparators U1a, U1b or U1c, U1d connected in parallel, for obtaining adequate base drive. Nonlinear horizontal ramp voltage V3 is produced by network 24, including resistor R14, capacitor C11 and capacitor C12. Negative retrace pulses from winding W2b are an input to network 24. Nonlinear horizontal ramp voltage V4 is produced by network 26, including resistor R16, capacitor C13 and capacitor C14. Positive retrace pulses from winding W2a are an input to network 26. Voltage waveforms V3 and V4 are shown in FIG. 3, upper right. A voltage divider formed by resistor R12 and adjustable resistor R13 provide centering control.

A vertical sawtooth input current i5 is combined with vertical feedback current i6 at the junction of resistors R3 and R4, resulting in vertical drive voltage V5. Vertical drive voltage V5 is compared with each of ramp voltages V3 and V4 for producing transistor switching pulses modulated in the time interval t5-t6. The nonlinearity of the horizontal ramp voltages V3 and V4 avoids instabilities during vertical retrace, and in particular, during the sharp negative peak of voltage V5. Without the non-linearity shown, transistor Q1 can turn on too early and produce some ringing at the very TOP of the raster.

The overlapping operation of the output stage, explained above in connection with FIGS. 1 and 2, is obtained by the overlap of the horizontal ramp voltages V3 and V4, clear from the illustration in FIG. 3. The overlapping is controlled by network 24, wherein resistor R15 and diode D7 charge capacitor C12 negatively, to reduce the natural overlap of ramp voltages V3 and V4. More particularly, network 24 sets the DC level of ramp voltage V3.

The peak collector voltages on transistors Q1 and Q2 are approximately 70 volts during vertical trace. During vertical retrace, the collector voltage of transistor Q2 increases to approximately 150 volts because capacitor C2 is clamped by diode D3 to the vertical deflection yoke retrace voltage. A Zener diode D5 is connected across transistor Q2 for protection during retrace. The Zener diode D5 limits the collector voltage on transistor Q2 to approximately 120 volts. The peak to peak pincushion correction current in deflection yoke Lv is approximately 100 mA, corresponding to a pincushion distortion of approximately 14%.

The loading of the flyback transformer T1 is symmetrical, in contrast to other switched vertical deflection circuits. This avoids horizontal raster distortion in the East-West direction. No DC power supply is needed. The AC coupling between the flyback transformer and the deflection circuit, provided by capacitors C1 and C2, protects the picture tube against excessive yoke currents in the absence of base drive for transistors Q1 and/or Q2. The circuit may be adapted to different yoke impedances by changing component values. Operation without North-South raster correction can be implemented by omitting transformer T2 and the associated components. The DC yoke coupling allows $2f_H$, 100 Hz field sequential (AA-BB) operation. The components determining the frequency must be changed for operation at $2f_H$ and 100 Hz.

What is claimed is:

1. A switched vertical deflection system, comprising:
   means energized by a source of horizontal rate pulses for generating respective charging and discharging currents;
   means for modulating said currents, said modulated currents having zero values substantially coincident with the centers of horizontal retrace intervals;
   a vertical deflection yoke; and,
   energy storage means responsive to said modulated currents for developing a vertical deflection voltage for driving a vertical deflection current in said vertical yoke, said vertical deflection voltage having zero crossings substantially coincident with the centers of said horizontal retrace intervals and maxima substantially coincident with the centers of horizontal trace intervals, and a North-South pincushion correction current being generated in said vertical deflection yoke by integration of said vertical deflection voltage.

2. The system of claim 1, wherein said charging and discharging currents are bipolar currents having zero crossings substantially coincident with the centers of said horizontal retrace intervals.

3. The system of claim 1, wherein said vertical deflection current is related to an amplitude difference between only positively valued portions of said charging and discharging currents.

4. The system of claim 1, wherein said source of horizontal rate pulses is AC coupled to said modulating means.

5. The system of claim 1, wherein said modulating means divert negatively valued portions of said charging and discharging currents from flowing through said energy storage means.

6. The system of claim 1, wherein said modulating means directs positively and negatively valued portions of said charging and discharging currents along different paths.

7. The system of claim 1, further comprising a transformer having a first winding capacitively coupled to said energy storage means and a second winding forming part of a horizontal rate resonant circuit coupled in series with said vertical deflection yoke.

8. A deflection system, comprising:
windings of opposite polarity transformer coupled to a source of a first deflection current;
respective inductances coupled to said transformer coupled windings;
respective energy storage means coupled to said inductances and charged oppositely by respective currents flowing through said windings;
further energy storage means coupled to said respective energy storage means;
a deflection yoke for conducting a second deflection current driven by said further energy storage means;
respective switching means coupled to said respective energy storage means for controlling respective conduction paths between said respective energy storage means and said further energy storage means to transfer respective quantities of energy; and,
means for controlling said respective switching means.

9. The system of claim 8, wherein said windings are coupled at a junction, and said junction is coupled to ground.

10. The system of claim 8, wherein said windings are different parts of a substantially centertapped winding, said centertap being coupled to ground.

11. The system of claim 8, wherein said respective inductances and respective energy storage means comprise an inductor coupled between each of said windings and a capacitor.

12. The system of claim 8, wherein each of said respective switching means comprises:
a switch responsive to said controlling means;
a first diode coupled to said switch and coupled to said respective energy storage means; and,
a second diode coupled to said respective energy storage means, coupled to said first diode and coupled to said further energy storage means.

13. The system of claim 9, wherein said respective inductances and respective energy storage means comprise an inductor coupled between each of said windings and a capacitor.

14. The system of claim 13, wherein each of said respective switching means comprises:
a switch responsive to said controlling means;
a first diode coupled to said switch and coupled to said respective energy storage means; and,
a second diode coupled to said respective energy storage means, coupled to said first diode and coupled to said further energy storage means.

15. A switched vertical deflection system, comprising:
first and second switching means transformer coupled to a source of horizontal rate pulses for generating first and second currents respectively, having respective outputs coupled together at a first junction for developing a composite current from said first and second currents;
means coupled to said first junction and responsive to said composite current for developing a vertical deflection control voltage for driving a vertical deflection current;
a vertical deflection yoke driven by said vertical deflection current; and,
means for controlling said first and second switching means to modulate said first and second currents.

16. The system of claim 15, wherein said source of horizontal rate pulses comprises a flyback transformer having first and second windings, each winding having a grounded terminal.

17. A switched vertical deflection system, comprising:
a vertical deflection yoke;
a flyback transformer having first and second windings transformer coupled to a source of a horizontal deflection current, said first and second windings each having a grounded terminal;
first and second switching means respectively coupled to said first and second windings for modulating currents energized by said horizontal deflection current;
means coupled to said first and second switching means and responsive to said modulated currents for developing a vertical deflection control voltage for driving a vertical deflection current in said vertical deflection yoke; and,
means for controlling said first and second switching means.

18. The system of claim 17, wherein said currents energized by said horizontal deflection current are bipolar currents of opposite polarity.

19. A switched vertical deflection system, comprising:
means energized by a source of horizontal rate pulses for generating first and second currents;
means operable only during horizontal trace intervals for modulating said first and second currents, to generate a vertical deflection control current beginning during horizontal retrace intervals;
a vertical deflection yoke; and,
means responsive to said vertical deflection control current for developing a vertical deflection voltage for driving a vertical deflection current in said vertical deflection yoke.

20. The system of claim 19, wherein said beginning time of said vertical deflection control current is always substantially coincident with zero crossings of said first and second currents and with the centers of said horizontal retrace intervals.

21. The system of claim 19, wherein said first and second currents are bipolar currents.

22. The system of claim 19, wherein said first and second current generating means are AC coupled to said modulating means.

23. A switched vertical deflection system, comprising:
a source of horizontal rate pulses;

means energized by said horizontal rate pulses for generating bipolar currents;

means for modulating said bipolar currents;

a vertical deflection yoke; and, energy storage means responsive to said modulated currents for developing a vertical deflection voltage for driving a vertical deflection current in said vertical deflection yoke.

24. The system of claim 23, wherein said vertical deflection control current always begins at a time substantially coincident with zero crossings of said bipolar currents and with the centers of horizontal retrace intervals.

25. The system of claim 23, wherein said modulating means are operable only during horizontal trace intervals.

26. The system of claim 23, wherein said bipolar current generating means are AC coupled to said modulating means.

27. A switched vertical deflection system, comprising:

first and second windings inductively coupled with opposite polarity to a source of retrace pulses from a horizontal deflection circuit;

means energized by said retrace pulses for generating currents of opposite polarity;

respective means for directing positively and negatively valued portions of said currents along different paths;

a vertical deflection yoke; and, energy storage means responsive to said currents for developing a vertical deflection voltage for driving a vertical deflection current in said vertical yoke, said positively valued portions of said currents being conducted through said energy storage means and said negatively valued portions of said currents being discharged.

28. A switched vertical deflection system, comprising:

first and second windings inductively coupled with opposite polarity to a source of retrace pulses from a horizontal deflection circuit;

means energized by said retrace pulses for generating currents of opposite polarity;

energy storage means;

respective means for directing positively and negatively valued portions of said currents along different paths, each of said directing means comprising:

a current discharge path;

first means for conducting positively valued portions of said respective current through said energy storage means and for blocking negatively valued portions of said respective current from flowing through said energy storage means; and, second means for conducting negatively valued portions of said respective current through said current discharge path and for blocking positively valued portions of said respective current from flowing through said current discharge path; and, a vertical deflection yoke, said energy storage means being responsive to said positively valued current portions for developing a vertical deflection voltage for driving a vertical deflection current in said vertical yoke.

29. A switched vertical deflection system, comprising:

first and second windings inductively coupled with opposite polarity to a source of retrace pulses from a horizontal deflection circuit;

means energized by said retrace pulses for generating currents of opposite polarity;

energy storage means;

a series circuit comprising a first semiconductor switch defining a first discharge path, four similarly poled diodes and a second semiconductor switch defining a second discharge path, coupled in between two sources of ground potential, for directing positively and negatively valued portions of said currents along different paths; and, a vertical deflection yoke, said energy storage means being responsive to said currents for developing a vertical deflection voltage for driving a vertical deflection current in said vertical yoke, positively valued portions of said currents being conducted through said energy storage means and negatively valued portions of said currents being conducted through said discharge paths.

30. A deflection system comprising:

first and second windings transformer coupled to a source of a first deflection current;

first and second energy storage means respectively coupled to said windings and charged oppositely by first and second currents flowing through said windings;

means for modulating said first current, comprising:

a first switch;

a first diode coupled to said switch and to said first energy storage means; and, a second diode coupled to said first energy storage means, said first diode and a junction;

means for modulating said second current, comprising:

a second switch;

a third diode coupled to said switch and to said second energy storage means; and, a fourth diode coupled to said second energy storage means, said third diode and said junction;

means coupled to said junction for developing a control voltage related to said first and second modulated currents;

a deflection yoke for generating a second deflection current driven by said control voltage developing means; and, means for controlling said first and second current modulating means.

* * * * *

UNITED STATES PATENT AND TRADEMARK OFFICE
CERTIFICATE OF CORRECTION

PATENT NO. : 5,111,120

DATED : May 5, 1992

INVENTOR(S) : Peter E. Haferl

It is certified that error appears in the above-identified patent and that said Letters Patent is hereby corrected as shown below:

On the title page, item

[56] References Cited

U.S. PATENT DOCUMENTS

Add --4,314,184    2/1982    Ryan.................... 315/408--

Column 12, line 4, after "valued" delete first instance of [current]

Signed and Sealed this

Fourteenth Day of May, 1996

*Attest:*

BRUCE LEHMAN

*Attesting Officer*      *Commissioner of Patents and Trademarks*